(12) United States Patent
Kalecl

(10) Patent No.: US 11,452,262 B1
(45) Date of Patent: Sep. 27, 2022

(54) MANUAL HAND-HELD CLONE CLUTTERS

(71) Applicant: Robert Kalecl, Riverside, CA (US)

(72) Inventor: Robert Kalecl, Riverside, CA (US)

( * ) Notice: Subject to any disclaimer, the term of this patent is extended or adjusted under 35 U.S.C. 154(b) by 213 days.

(21) Appl. No.: 16/936,824

(22) Filed: Jul. 23, 2020

Related U.S. Application Data

(63) Continuation-in-part of application No. 15/972,768, filed on May 7, 2018, now Pat. No. 10,966,373.

(60) Provisional application No. 62/878,496, filed on Jul. 25, 2019, provisional application No. 62/504,270, filed on May 10, 2017.

(51) Int. Cl.
*A01G 2/10* (2018.01)
*A01G 3/02* (2006.01)

(52) U.S. Cl.
CPC .................. *A01G 2/10* (2018.02); *A01G 3/02* (2013.01)

(58) Field of Classification Search
CPC .. A01G 3/047; A01G 3/02; A01G 2/10; A24F 13/26; A24F 13/24
See application file for complete search history.

(56) References Cited

U.S. PATENT DOCUMENTS

| 477,249 | A | * | 6/1892 | Dixon | A24F 13/26 30/113 |
|---|---|---|---|---|---|
| 599,879 | A | * | 3/1898 | Tabb | A24F 13/26 30/112 |
| 738,540 | A | * | 9/1903 | Hopkins | A24F 13/26 131/255 |
| 1,294,479 | A | * | 2/1919 | Kollmar | A24F 13/26 30/113 |
| 5,893,212 | A | * | 4/1999 | Meister | A24F 13/26 30/279.2 |
| 5,974,669 | A | * | 11/1999 | Bertino | A24F 13/26 30/151 |
| 6,076,260 | A | * | 6/2000 | Williamson, IV | A24F 13/26 30/304 |
| 6,216,346 | B1 | * | 4/2001 | Wechsler | A24F 13/26 30/113 |
| 2007/0089299 | A1 | * | 4/2007 | Belaubre | A24F 13/26 30/112 |
| 2021/0400882 | A1 | * | 12/2021 | Gaffney | A01G 3/081 |

* cited by examiner

*Primary Examiner* — Monica L Barlow
(74) *Attorney, Agent, or Firm* — Roy L Anderson

(57) ABSTRACT

A hand-held device cuts plant stems at a desired angle after a stem is inserted into a stem shaft and a blade is actuated along a blade path at a desired angle.

13 Claims, 5 Drawing Sheets

MANUAL HAND-HELD CLONE CUTTERS

CROSS REFERENCE TO RELATED APPLICATIONS

This application is a non-provisional application which claims priority from U.S. Ser. No. 62/878,496, filed Jul. 25, 2019, the disclosure of which is specifically incorporated by reference herein in its entirety.

This application is also a continuation-in-part application which claims priority from U.S. Ser. No. 15/972,768, filed May 7, 2018, which is a non-provisional application which claims priority from U.S. Ser. No. 62/878,496, filed May 10, 2017, the disclosure of which are specifically incorporated by reference herein in their entireties.

FIELD OF THE INVENTION

The present invention is in the field of propagating plants by stem cuttings.

BACKGROUND OF THE INVENTION

A common method of preparing plant matter for planting or cloning is to cut the stem at an angle using a razor blade. This method is time-consuming, makes it difficult to cut accurate and repeatable angles, and is a potential safety hazard to the worker. This activity is common to many agricultural operations.

SUMMARY OF THE INVENTION

The present invention is generally directed to an apparatus for cutting stems having a housing configured with a stem slot to guide a plant stem into a stem channel at a preselected angle, the stem slot having an upper opening and a lower opening and two opposing mechanical grips configured generally to accept a thumb and a finger of a hand, with a cutting blade moveably held within the housing in a blade channel configured to move from an open position in which the cutting blade is held within the housing and does not extend into the stem slot to a cutting position in which the cutting blade has extended through the stem slot when a force is applied to at least one of the first and the second mechanical grips. A spring can be configured to cause the cutting blade to return from the closed position to the open position when the force is not applied to at least one of the two mechanical grips. The cutting blade cuts a plant stem at the preselected angle which promotes healthy root growth and is not a perpendicular cut relative to a diameter of the plant stem.

In other aspects of the present invention, the housing can include a removable cover configured to allow replacement of the cutting blade and/or allow replacement of the spring.

In still further aspects of the present invention, the apparatus is configured so that the cutting blade is not accessible to a finger of a hand when the cutting blade moves from the open position to the closed position and the removable cover is not removed while the first mechanical grip is configured to receive a thumb of a hand and the second mechanical grip is configured to receive one or more fingers of the hand other than the thumb.

Accordingly, it is an object of the present invention to provide an improved method of plant propagation via a hand-held plant cutter.

This and further objects and advantages will be apparent to those skilled in the art in connection with the drawings and the detailed description of the invention set forth below.

BRIEF DESCRIPTION OF THE DRAWINGS

FIG. 1 illustrates a cover, FIG. 1A is a top plan view of the cover, FIG. 1B is a side view of the cover, and FIG. 1C is a bottom plan view of the cover.

FIG. 2 illustrates a mechanical grip, FIG. 2A is a top plan view of the mechanical grip, FIG. 2B is a side view of the mechanical grip illustrating a blade channel, and FIG. 2C is an alternative side view of the mechanical grip.

FIG. 3 illustrates another mechanical grip which complements the mechanical grip of FIG. 2, FIG. 3A is a bottom plan view of the mechanical grip, FIG. 3B is a side view of the mechanical grip, and FIG. 3C is a top plan view of the mechanical grip.

FIG. 4 is a picture of the embodiment illustrated in FIGS. 1-3 in a partially disassembled state while FIG. 5 is a picture of the same embodiment in a less disassembled state.

DETAILED DESCRIPTION OF THE INVENTION

In accordance with the present invention, plant propagation can be accomplished by use of a hand-held device that holds and moves a blade or sharpened feature to cut a stem at a desired cutting angle to promote healthy root growth. The cut stem is cut at a desired blade angle and blade path. The action is repeatable and speeds up a manual method while also increasing worker safety by containing the blade and cutting motion inside the device.

In an especially preferred embodiment, a piece of plant-matter is inserted stem-first into a stem slot which guides the stem into the device. To cut the stem, a blade held on a support is caused to slice through the stem at a desired cutting angle, such as 45 degrees, my manually actuation of the device.

There are three different embodiments presently contemplated for this device.

The invention will now be described in even greater detail by reference to an especially preferred embodiment illustrated in FIGS. 1-5. In the Figures and the following description, number designations indicate various features of the invention, with like number designations referring to like features throughout both the drawings and the description. Although the Figures are described in greater detail below, the following is a glossary of the elements identified in the Figures.

Figure 1:
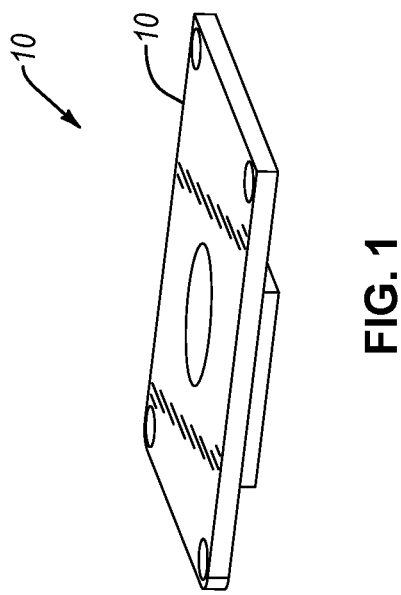
FIGS. 1 and 1A-1C, 2 and 2A-2C, 3 and 3A-3C, 4 and 5 illustrate one especially preferred embodiment of the present invention.
Figure 1A:
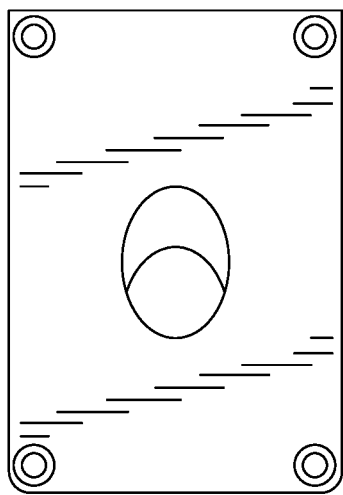
Figure 1B:
Figure 1C:
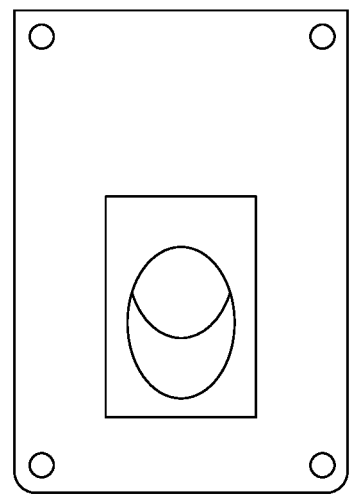
Figure 2:
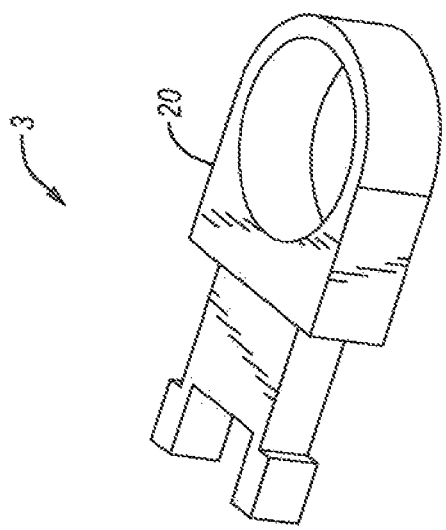
Figure 2A:
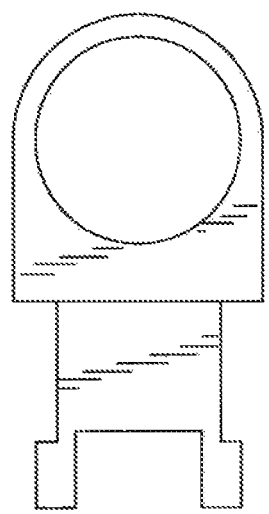
Figure 2B:
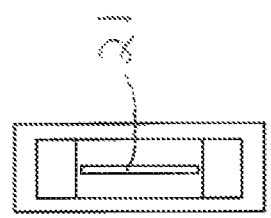
Figure 2C:
Figure 3:
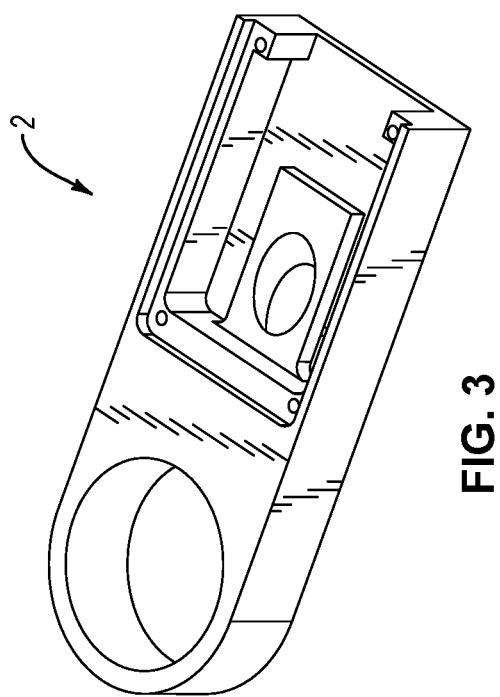
Figure 3A:
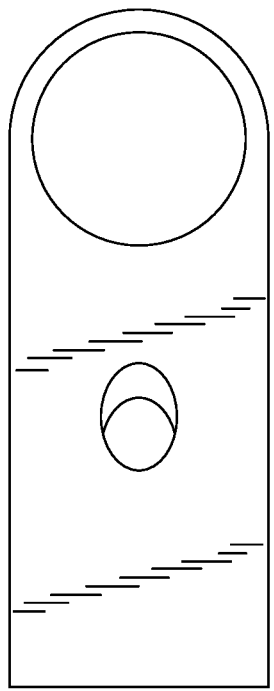
Figure 3B:
Figure 3C:
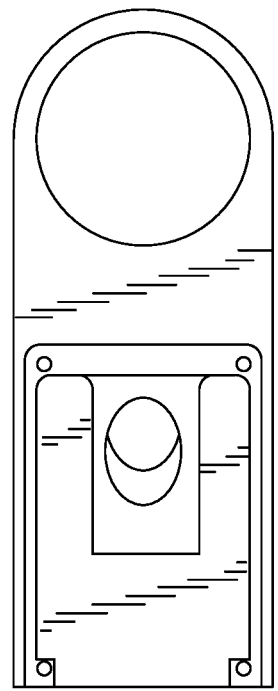
Figure 4:
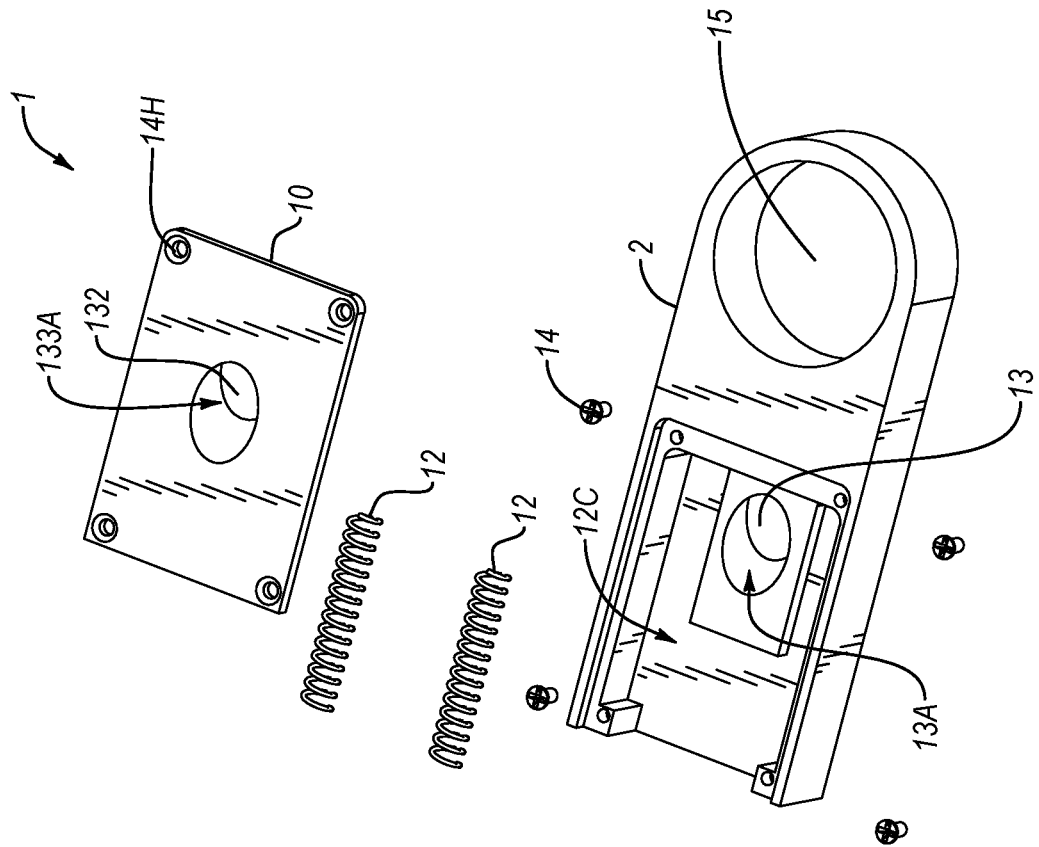
Figure 4:
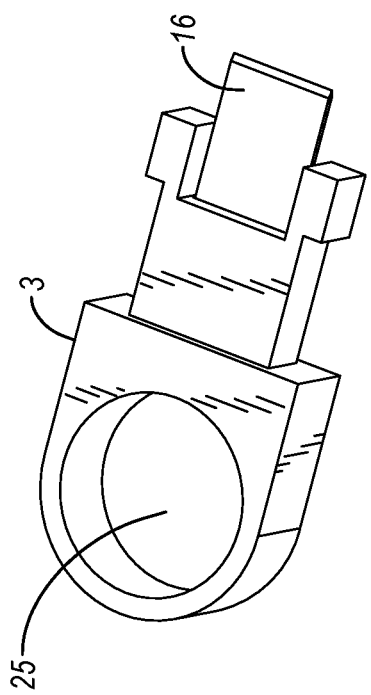
Figure 5:
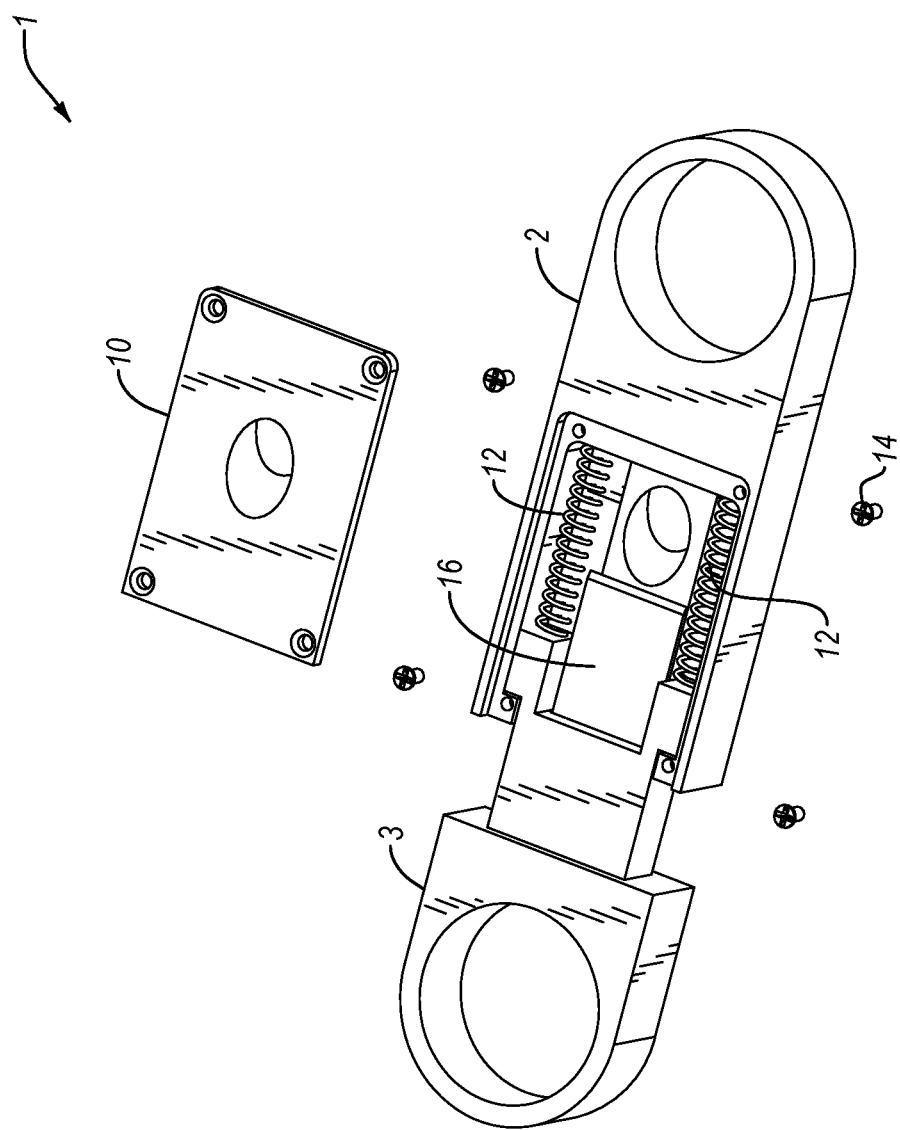

1 clone cutter
  2 first mechanical grip
  3 second mechanical grip
  10 removable cover
  12 spring
  12C spring channel
  13 lower angled stem slot
  13A angle of lower angled stem slot 13
  14 screw
  14H screw hole
  15 first finger hole
  16 cutting blade
  21 blade channel
  25 second finger hole 132 upper angled stem slot 133A angle of upper angled stem slot In a first embodiment illustrated in FIGS. 1-3, which is contemplated to be a more permanent device, slots for a thumb and another finger are present in the parts shown in FIGS. 2 and 3 while cover 10, illustrated in FIG. 1, is designed to be removable (by removal of four screws) and contains a stem slot at a 45 degree angle. Another stem slot at a 45 degree angle is found in the body, anvil side (FIG. 3) which is aligned with the stem slot of the cover but spaced sufficiently apart so that a blade held by the body, blade side (FIG. 2) can pass between the stem slots of the cover and body, anvil side, thus cutting the stem at a 45 degree angle. As shown in FIG. 2B, the body, blade side contains a slot for holding a blade (not shown in FIG. 3) which is force fit into the slot, although it can also be retained by a mechanical means, such as one or more screws. The body, anvil side has two spring channels, which hold two springs, which are compressed within their channels by movement of the body, blade side toward the body, anvil side, when protrusions come into contact with the springs. FIG. 4 is a picture of a partially disassembled apparatus, as illustrated in FIGS. 1-3, in which the four screws from the cover have been removed, one spring has been removed, and one of two screws which hold the blade in place is visible, while FIG. 5 is a picture of the same apparatus with both springs in place and partly compressed due to action of the body, blade side forcing compression of the springs in the spring channels.

An important aspect of the first preferred embodiment is that the blade, when the device is fully assembled and being operated, cannot cut a finger, because the blade is not exposed except when it passes through the two stem slots, and these slots are sufficiently deep and of a small enough opening size, that a finger cannot get into either one of them to be cut by the blade.

In a second embodiment, the embodiment of FIGS. 1-4 is altered so that it is made disposable. In such an embodiment the blade and spring are not replaceable, and the blade may be secured by injection molding.

In a third embodiment, the actuation of the blade into a blade channel (such as the two stem slots of the first embodiment) is accomplished by squeezing two handles toward one another, in an action similar to that of a wrist exerciser. In this embodiment the key difference is that use a palm and fingers, rather than simply fingers, to actuate the cutting action.

Although the foregoing detailed description is illustrative of preferred embodiments of the present invention, it is to be understood that additional embodiments thereof will be obvious to those skilled in the art. Further modifications are also possible in alternative embodiments without departing from the inventive concept. For example, a blade or cutting device might be replaced by a laser.

Accordingly, it will be readily apparent to those skilled in the art that still further changes and modifications in the actual concepts described herein can readily be made without departing from the spirit and scope of the disclosed inventions.

What is claimed is:

1. An apparatus, comprising:
    a housing configured with a stem slot to guide a plant stem into a stem channel at a preselected angle, the stem slot having an upper opening and a lower opening;
    a first mechanical grip;
    a second mechanical grip;
    a cutting blade moveably held within the housing in a blade channel configured to move from an open position in which the cutting blade is held within the housing and does not extend into the stem slot to a cutting position in which the cutting blade has extended through the stem slot when a force is applied to at least one of the first and the second mechanical grips; and
    a spring configured to cause the cutting blade to return from the closed position to the open position when the force is not applied to at least one of the first and the second mechanical grips;
    wherein the cutting blade cuts a preselected plant stem extending from the upper opening through the lower opening at the preselected angle when the cutting blade moves from the open position to the closed position; and
    wherein the preselected angle promotes healthy root growth and is not a perpendicular cut relative to a diameter of the preselected plant stem.

2. The apparatus of claim 1, wherein the housing further comprises a removable cover configured to allow replacement of the cutting blade.

3. The apparatus of claim 2, wherein the removable cover is configured to allow replacement of the spring.

4. The apparatus of claim 2, wherein the apparatus is configured so that the cutting blade is not accessible to a finger of a hand when the cutting blade moves from the open position to the closed position and the removable cover is not removed.

5. The apparatus of claim 1, wherein the housing further comprises a removable cover configured to allow replacement of the spring.

6. The apparatus of claim 1, wherein the apparatus is configured so that the cutting blade is not accessible to a finger of a hand when the cutting blade moves from the open position to the closed position.

7. The apparatus of claim 1, wherein the first mechanical grip is configured to receive a thumb of a hand and the second mechanical grip is configured to receive a finger of the hand other than the thumb.

8. The apparatus of claim 1, wherein the first mechanical grip is configured to receive a thumb of a hand and the second mechanical grip is configured to receive a plurality of fingers of the hand other than the thumb.

9. An apparatus, comprising:
    a housing configured with a stem slot to guide a plant stem into a stem channel at a preselected angle, the stem slot having an upper opening and a lower opening;
    an anvil side configured with a first finger grip;
    a blade side configured with a second finger grip;
    a cutting blade moveably held within the housing in a blade channel configured to move from an open position in which the cutting blade is held within the housing and does not extend into the stem slot to a cutting position in which the cutting blade has extended through the stem slot when a force is applied to at least one of the first and the second finger grips;
    wherein the cutting blade cuts a preselected plant stem extending from the upper opening through the lower opening at the preselected angle when the cutting blade moves from the open position to the closed position; and
    wherein the preselected angle promotes healthy root growth and is not a perpendicular cut relative to a diameter of the preselected plant stem.

10. The apparatus of claim 9, wherein one of the first and second finger grips is configured for use by a thumb.

11. The apparatus of claim 9, further comprising opening means configured to cause the cutting blade to return from the closed position to the open position when the force is not applied to at least one of the first and the second mechanical grips.

12. The apparatus of claim 11, wherein the opening means comprises at least one spring.

13. A method, comprising the steps of:
- inserting a plant stem into a stem channel of a hand-held housing at a preselected angle; and
- causing a cutting blade to move within a blade channel within the hand-held housing to cut the plant stem at a preselected angle by pushing a thumb grip and a finger grip toward each other;
- wherein the preselected angle promotes healthy root growth and is not a perpendicular cut relative to a diameter of the plant stem; and
- wherein the hand-held housing is configured so that the cutting blade is not accessible to a finger of a hand when the cutting blade moves from an open position to a closed position when the plant stem is cut.

* * * * *